United States Patent
Shaffer et al.

(10) Patent No.: US 9,696,420 B2
(45) Date of Patent: Jul. 4, 2017

(54) ACTIVE PARK ASSIST OBJECT DETECTION

(71) Applicant: FORD GLOBAL TECHNOLOGIES, LLC, Dearborn, MI (US)

(72) Inventors: Aric David Shaffer, Saline, MI (US); Vern Stempnik, Roseville, MI (US); Brian Choi, Ann Arbor, MI (US); Mark Crawford, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 964 days.

(21) Appl. No.: 13/859,128

(22) Filed: Apr. 9, 2013

(65) Prior Publication Data

US 2014/0300504 A1  Oct. 9, 2014

(51) Int. Cl.
*G01S 13/86* (2006.01)
*G01S 13/93* (2006.01)
*G01S 15/93* (2006.01)

(52) U.S. Cl.
CPC ............ *G01S 13/86* (2013.01); *G01S 13/862* (2013.01); *G01S 13/931* (2013.01); *G01S 15/931* (2013.01); *G01S 2013/9314* (2013.01); *G01S 2013/9375* (2013.01); *G01S 2013/9378* (2013.01); *G01S 2013/9385* (2013.01); *G01S 2015/933* (2013.01)

(58) Field of Classification Search
CPC ...... G01S 13/86; G01S 13/862; G01S 15/931; G01S 13/931; G01S 2013/9378; G01S 2013/9314; G01S 2015/933; G01S 2013/9375; G01S 2013/9385

USPC ................. 342/70–72, 27, 52, 118; 701/301; 340/435–436, 903
See application file for complete search history.

(56) References Cited

U.S. PATENT DOCUMENTS

| | | | | |
|---|---|---|---|---|
| 6,326,887 B1* | 12/2001 | Winner | ................. | B60Q 9/007 180/167 |
| 6,396,535 B1* | 5/2002 | Waters | .................... | G01S 11/12 348/143 |
| 6,483,441 B1* | 11/2002 | Hinde | .................... | B60Q 9/004 340/435 |
| 7,046,822 B1* | 5/2006 | Knoeppel | ............. | B60W 30/16 348/169 |
| 7,069,128 B2 | 6/2006 | Iwama | | |
| 8,130,120 B2 | 3/2012 | Kawabata et al. | | |
| 8,260,001 B2 | 9/2012 | Jung | | |
| 8,285,479 B2 | 10/2012 | Kawabata et al. | | |
| 8,319,663 B2 | 11/2012 | Von Reyher et al. | | |
| 8,378,850 B2 | 2/2013 | Toledo et al. | | |
| 8,736,463 B1* | 5/2014 | Zhu | ........................ | G06T 7/0081 340/933 |

(Continued)

FOREIGN PATENT DOCUMENTS

| | | |
|---|---|---|
| EP | 2093129 A2 | 8/2009 |
| EP | 2428431 A1 | 3/2012 |
| GB | 2319420 A | 5/1998 |

*Primary Examiner* — John B Sotomayor
(74) *Attorney, Agent, or Firm* — Frank MacKenzie; Brooks Kushman P.C.

(57) ABSTRACT

A method of assessing an area for parking a vehicle includes ultrasonically scanning the area to obtain ultrasonic data, radar scanning the area to obtain radar data, and determining whether to park the vehicle in the area based on both the ultrasonic data and the radar data.

17 Claims, 4 Drawing Sheets

(56) References Cited

U.S. PATENT DOCUMENTS

| | | | | |
|---|---|---|---|---|
| 2002/0005778 | A1* | 1/2002 | Breed | B60Q 9/008 340/435 |
| 2004/0036601 | A1* | 2/2004 | Obradovich | G08G 1/167 340/540 |
| 2004/0090203 | A1* | 5/2004 | Appel | B60J 7/0573 318/480 |
| 2005/0075770 | A1 | 4/2005 | Taylor et al. | |
| 2005/0122234 | A1* | 6/2005 | Danz | B60Q 9/007 340/932.2 |
| 2006/0017807 | A1* | 1/2006 | Lee | B60R 1/00 348/36 |
| 2007/0005609 | A1* | 1/2007 | Breed | B60N 2/2863 |
| 2007/0182528 | A1* | 8/2007 | Breed | B60Q 9/008 340/435 |
| 2008/0252486 | A1* | 10/2008 | Luke | B60W 10/20 340/932.2 |
| 2009/0128364 | A1* | 5/2009 | Lee | B60Q 9/004 340/932.2 |
| 2010/0007476 | A1* | 1/2010 | Klotz | G01S 13/931 340/425.5 |
| 2010/0030380 | A1 | 2/2010 | Shah et al. | |
| 2010/0039292 | A1* | 2/2010 | Scherl | B62D 15/027 340/932.2 |
| 2010/0063648 | A1* | 3/2010 | Anderson | G06N 5/043 701/1 |
| 2010/0117812 | A1* | 5/2010 | Laubinger | B60R 1/00 340/435 |
| 2010/0283634 | A1* | 11/2010 | Krautter | B60Q 9/004 340/932.2 |
| 2011/0068953 | A1 | 3/2011 | Toledo et al. | |
| 2011/0169957 | A1* | 7/2011 | Bartz | B60R 1/00 348/149 |
| 2011/0241857 | A1* | 10/2011 | Brandenburger | G01S 15/87 340/435 |
| 2011/0260887 | A1 | 10/2011 | Toledo et al. | |
| 2012/0101654 | A1* | 4/2012 | Samples | G08G 1/168 701/1 |
| 2012/0310481 | A1 | 12/2012 | Kanning et al. | |
| 2013/0099943 | A1* | 4/2013 | Subramanya | G01S 7/2926 340/933 |
| 2013/0279392 | A1* | 10/2013 | Rubin | H04W 72/005 370/312 |
| 2013/0279393 | A1* | 10/2013 | Rubin | H04J 3/1694 370/312 |
| 2014/0292542 | A1* | 10/2014 | Bruning | B62D 15/027 340/932.2 |
| 2014/0300504 | A1* | 10/2014 | Shaffer | G01S 13/86 342/27 |

* cited by examiner

ACTIVE PARK ASSIST OBJECT DETECTION

BACKGROUND

Ultrasonic sensors are relied upon to scan and locate a suitable parking space to assist drivers in parking their vehicles near the curb. However, environmental and other conditions pose a challenge to the robustness of the ultrasonic sensors and limit their effectiveness. In some cases, ultrasonic sensors fail to detect small objects and in other cases they fail to detect high objects such as trucks.

SUMMARY

A method of assessing an area for parking a vehicle includes ultrasonically scanning the area to obtain ultrasonic data, radar scanning the area to obtain radar data, and determining whether to park the vehicle in the area based on both the ultrasonic data and the radar data.

A non-transitory computer-readable medium tangibly embodying computer-executable instructions includes steps to assess a possible parking spot for a vehicle, acquire ultrasonic scanning data of the spot, acquire radar scanning data of the spot, and determine whether to park a vehicle based on both the ultrasonic and radar data.

A host vehicle includes an ultrasonic scanner, a radar scanner, and a computer. The computer is programmed to acquire ultrasonic data of an area, acquire radar data of the area, and determine whether to park the host vehicle in a possible parking spot based on the ultrasonic data and on the radar data.

DETAILED DESCRIPTION

An active park assist System relies on ultrasonic sensor technology to scan and locate a suitable parking space to assist drivers in parking their vehicles next to a curb. However, due to environmental or other conditions, the ultrasonic sensor may have limited capabilities and be limited in effectiveness in detecting small objects that are inside or outside of a target parking slot. Thus, the disclosed method is for parking a car where ultrasonic scanning and radar scanning data are obtained, the data is fused from both sensor types, and the car is parked based on the fused data.

Figure 1:
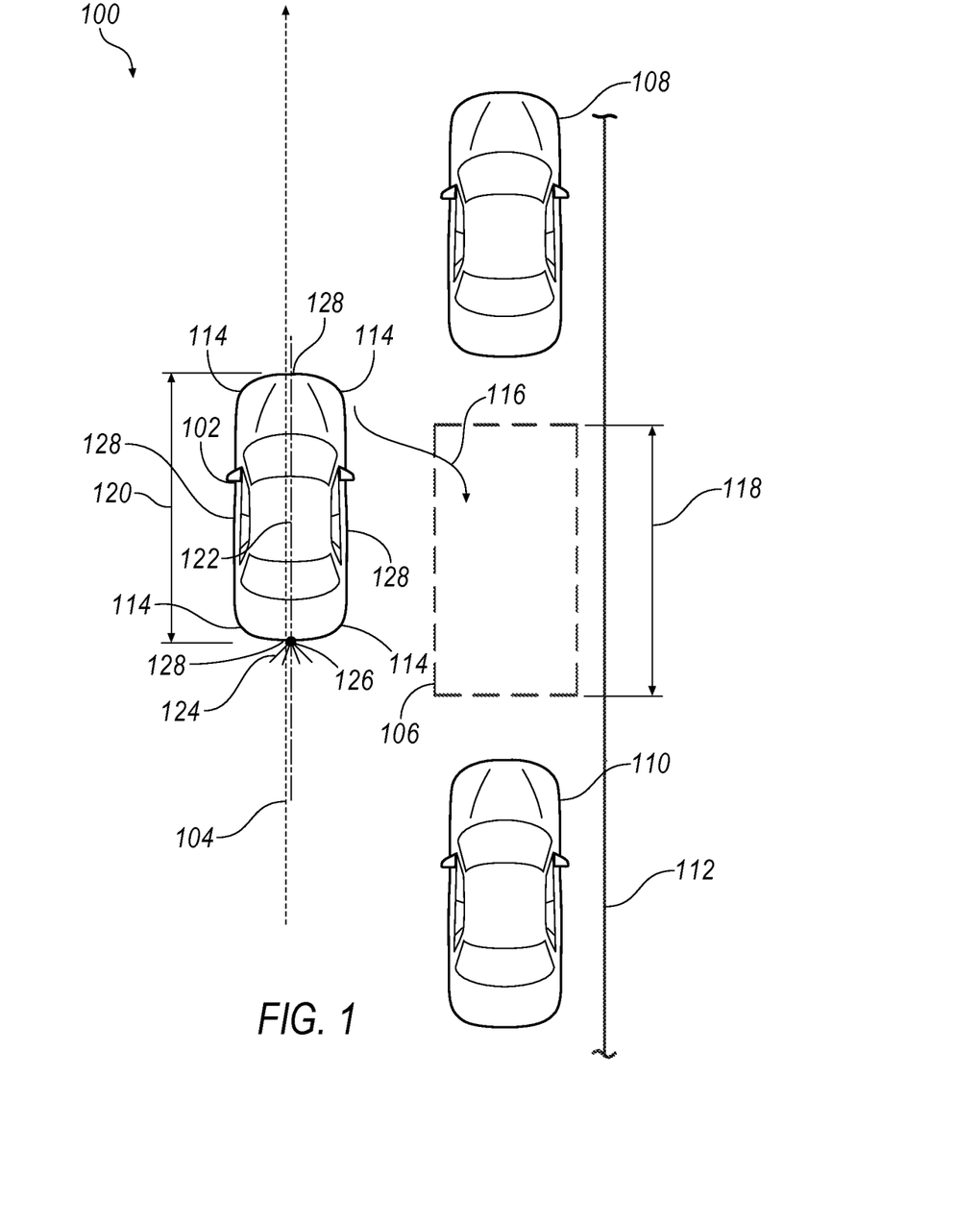
FIG. 1 illustrates a plan view of a host vehicle proximate front and rear cars that define a parking space for parking assist.

FIG. 1 shows an Active Park Assist (APA) parking assist scenario 100 in which a running or host vehicle 102, such as a car, may employ a park assist system for assisting or instructing a driver in what actions to take to park the vehicle, such as when parallel parking. As host vehicle 102 passes along a path 104, a parking space 106 is identified by the park assist system as located between two parked vehicles 108 and 110. Parking space is thus defined between vehicles 108, 110, and is also defined by a constraint on the far side, such as a curb 112. Parking space 106 may be defined or bounded by any type or number or objects or constraints, not necessarily vehicles 108, 110 and curb 112.

Figure 2:
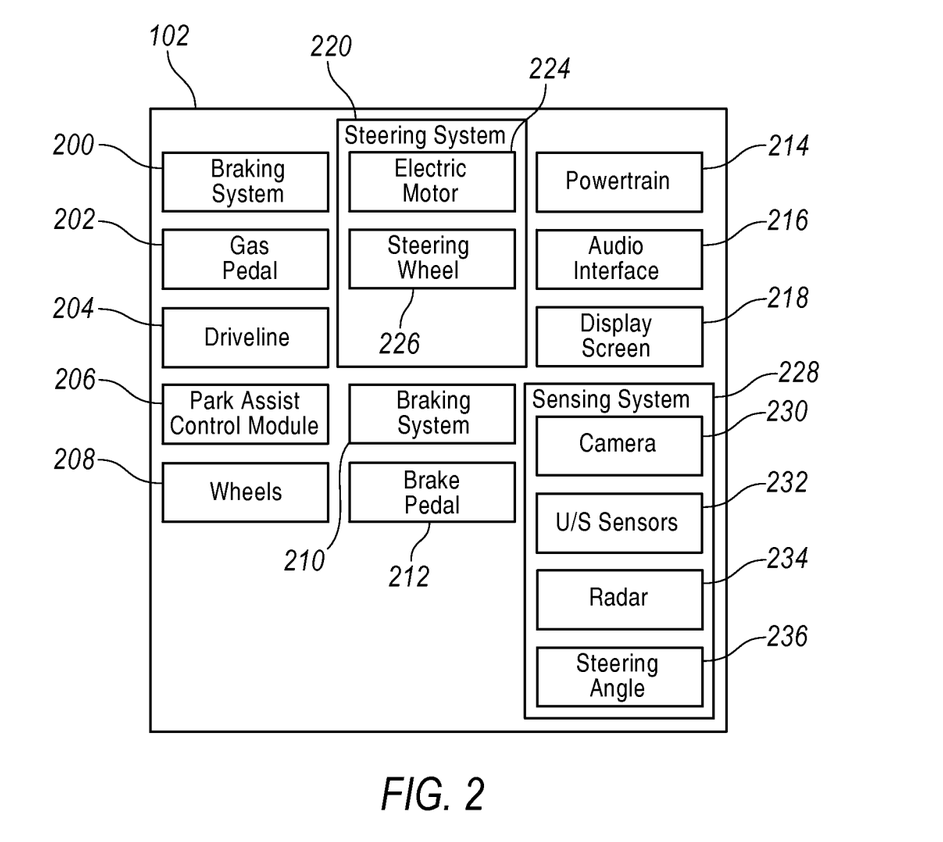
FIG. 2 illustrates elements of a host vehicle for parking assist.

Referring to FIG. 2, host vehicle 102 includes a braking system 200, a gas pedal 202, a driveline 204, a park assist control module (PACM) 206, and wheels 208. Vehicle 102 also includes a braking system 210, a brake pedal 212, a powertrain 214, an audio interface 216, and a display screen 218. A steering system 220 is shown in an example to include an electric motor 224 and a steering wheel 226. Steering system may be used in a power assisted steering system, or steering system 220 may include any type of steering system such as a conventional vacuum/hydraulic system, an electro-hydraulic power assisted system (EH-PAS), or a 'steer-by-wire' system. Host vehicle 102 may include an accelerometer that measures an acceleration of vehicle 102.

In the illustrated embodiment, a sensing system 228 is operatively connected to vehicle 102 and may be coupled to PACM 206 to provide input signal(s) thereto. Sensing system 228 includes sensors for sensing the vehicle environment, such as a camera 230, ultrasonic (U/S) sensors or scanners 232 (which may include a transmitter and sensor/receiver), radar or radar scanner 234, and a steering sensor 236, as examples. Although not illustrated, sensing system 228 may also include systems that include but are not limited to LIDAR, thermal sensors, and GPS. As shown in FIG. 1, four transceivers or sensors 114, such as ultrasonic sensors, may be located on the left and right sides of vehicle 102 adjacent front and rear bumpers to provide full or near-full 360° coverage around vehicle 102. The number, type, and/or the location of the sensors may be other than illustrated if so desired.

Sensing system 228 may include sensors for detecting the status or mode of operation of various systems on-board the vehicle 102, such as an odometer sensor (not shown) and/or steering wheel angle sensor 236. The odometer sensors may be located on one or more of wheels 226 of vehicle 102 and/or in the driveline system 204 of vehicle 102. Steering wheel angle sensor 236 is associated with steering system 220 of vehicle 102 and may, for example, be located on steering wheel 226 or on a steering column, as an example. Vehicle 102 may also be equipped with video display screen 218 for the display of various types of information to the driver. Vehicle 102 may also include audio interface device 216 such as a speaker, chime, buzzer, or other device for generating sound.

As shown in FIG. 1, vehicle 102 is parked into parking space 106 using PACM 206. To accomplish this, at least one of sensors 114 is used to detect neighboring objects and their location relative to the position of the vehicle 102 as vehicle 102 travels along path 104 and passes objects 110, 108. In FIG. 1, the neighboring objects that define parking space 106 are shown as being the two parked vehicles 110, 108 and curb 112. It is contemplated that PACM 206 may successfully identify a parking space 106 relative to only one object or vehicle, such as either the vehicle 108 or vehicle 110, if present.

PACM 206 includes a data processing component that processes the information from the sensor(s) to evaluate whether vehicle 102 may be successfully parked in parking space 106. The data processing component may, for example, be a micro-computer based device, as is well known. Evaluation by PACM 206 may involve determining if a valid steering trajectory 116 can be performed to park vehicle 102 in parking space 106. If a valid steering trajectory 116 exists, PACM 206 deems parking space 106 to be a feasible parking space. The calculations performed by PACM 206 may include a determination of a proper slot length 118 depending upon considerations such as a length 120 of vehicle 102, and/or an achievable turning radius of vehicle 102, and/or any other geometric considerations related to vehicle 102 and/or other objects in the vicinity of parking space 106.

Movement of vehicle 102 along steering trajectory 116 may be performed in one or more parking maneuvers as may be necessary until it is properly parked. As used herein, one parking maneuver is defined as (1) moving the vehicle rearwardly from a stop into the parking space, (2) stopping the vehicle briefly within the parking space, (3) moving the vehicle forward within the parking space, and (4) then stopping and thus parking the vehicle. At least one actuation or movement of steering system 220 is usually required in association with each of the steps in the parking maneuver to achieve trajectory 116. A subsequent rearward and/or forward movement of vehicle 102 may be necessary if parking space 106 is too short relative to vehicle length 120 and/or turning radius, which defines an additional parking maneuver.

Once it is determined that vehicle 102 is properly parked in a desired parked condition, PACM 206 operates steering system 220 to return it to a centered condition. In one example, this involves actuating electric motor 224 to move steering wheel 226 and associated components of steering system 220 so that the steerable road wheels of vehicle 102 are aligned parallel with a longitudinal (front-to-rear) axis 122 of vehicle 102.

Figure 3:
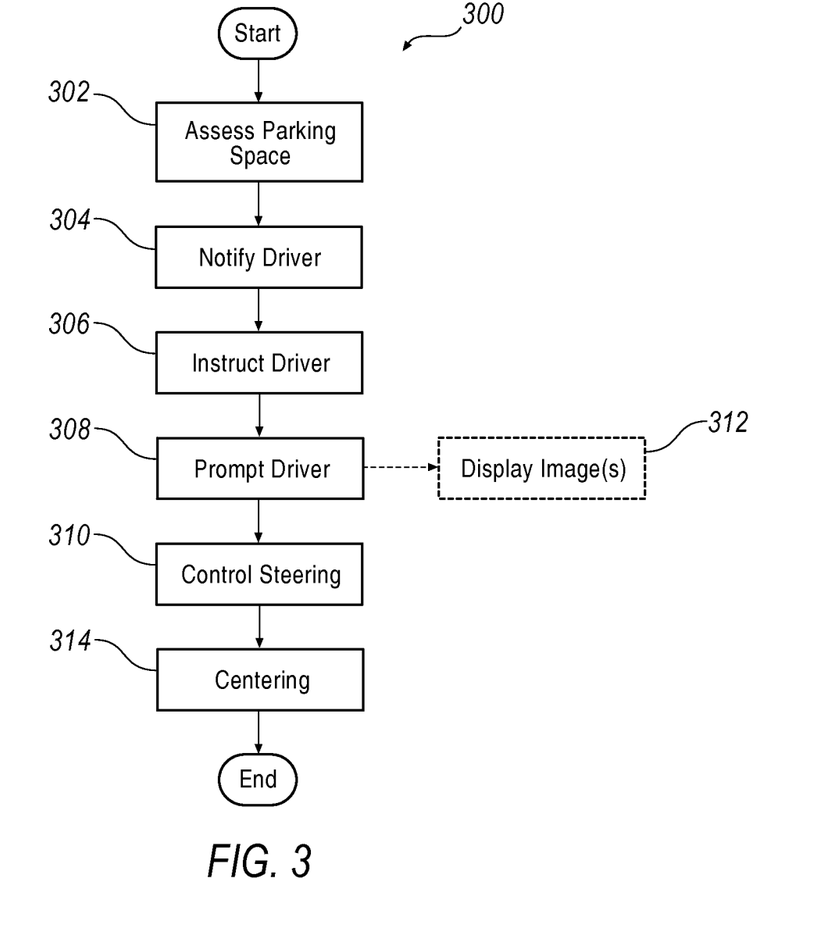
FIG. 3 illustrates a flowchart of a method for parking a vehicle.

Referring to FIG. 3, a flow chart 300 shows a method for parking a vehicle. At first step 302 a processing module, such as PACM 206, determines if there is a feasible parking space available for parking of vehicle 102. This may be accomplished, for example, using signals from sensor(s) 114 of sensing system 228. A feasible parking space is one, such as parking space 106, that is sufficiently large for vehicle 102 to fit into using the park assist system with which it is equipped.

If the parking space is determined at step 302 to be feasible for parking, the driver is notified or alerted at step 304 that a feasible parking space is available. The notification may be delivered via a visual and/or audible signal interface to, for instance, display screen 218 within vehicle 102. Alternatively, the visual interface may be a graphic image, icon, or other non-text representation on display screen 218. Such a visual interface may be located at any appropriate location in vehicle 102, such as an overhead console. Audible signals may be via audio interface 216, as another example.

Next, at step 306 the driver is instructed to stop the vehicle and to accept the system assistance to park. This instruction may be delivered visually and/or audibly, and may be accomplished by the same interface(s) used in step 304. Once the driver has stopped vehicle 102, at step 308 the driver is prompted to remove hands from the steering control device of the steering system (steering wheel 226, for example) and to actuate a brake control device (such as brake pedal 212) and a transmission control device (such as a gear select lever or button) to engage or shift the transmission of powertrain system 214 into reverse gear.

At step 310 the park assist system takes over control of steering system 224 to execute steering trajectory 116. In one example, the park assist system generates signals to prompt the driver to take actions necessary to drive the vehicle backwards and pull forward (in one or more parking maneuvers) to achieve a parked condition of vehicle 102 in parking space 106. The parked condition may be defined, depending upon the nature and dimensions of the parking space, as when vehicle 102 is within a certain distance of one or more of the objects or features that define the space and/or within a certain angular measure of being parallel with the appropriate objects/features.

Driver actions prompted at step 308 may include actions such as actuating brake pedal 212 of braking system 210 to control the speed of the vehicle and/or actuating a transmission control device to engage or shift the transmission of the powertrain system 214 between forward and reverse gears.

As indicated at step 312, the method may optionally include displaying to the driver an image of the parking space environment. For example, an image 124 from a rear view camera 126 may be displayed on a video display screen. In another example, a simulated or virtual top view showing the vehicle and its location relative to the parking space may be displayed on display screen 218. Either of these images may be overlaid with lines and/or other symbols depicting the desired steering trajectory 116. In one embodiment, radar systems 128 may be included in the front, and/or rear, and/or sides of vehicle 102.

When the park assist system has determined that vehicle 102 is properly parked and the final movement of the parking maneuver is complete, the method progresses to step 314 where steering system 220 is operated to place it in a centered condition between surrounding objects such as vehicles 108, 110, or generally in line with curb 112 and/or path 104. This may involve actuating electric motor 224 that provides power boost to the steering system so as to move steering wheel 226 along with associated components of steering system 220 until vehicle 102 wheels are parallel with axis 122 of vehicle 102.

Although the parking space 106 has been described as a parallel parking space between a forward first object and a rearward second object, the parking space may alternatively be a rear perpendicular parking space, such as found in typical multi-vehicle parking lots and garages. Additionally, parking space 106 has been described as being on the right side of the vehicle 102, but alternatively the park assist system may be used to identify a parking space on the left side of vehicle 102.

The APA system relies on both ultrasonic scanning data and radar scanning data to identify and assess possible parking spaces for host vehicle 102 that is robust against environmental conditions (temperature variance, humidity, high gusting winds, etc. . . . ) that can pose challenges to using ultrasonic alone. In assessing the possible parking space, the disclosed method identifies object locations and whether object(s) identified present obstruction to parking, are outside the area for possible parking, or whether the object(s) themselves define the possible parking space (e.g, a vehicle in front and/or rear of parking space 106 such as parked vehicles 108 and 110). The method includes using one or more of ultrasonic sensors 114, as well as radar systems 128.

As one example, on occasion an object that is beyond curb 112 may include a planter, mailbox, or other object that is higher in elevation than curb 112. Ultrasonic sensors alone may therefore not be able to distinguish the curb from the other object, and may also errantly identify the other object as the curb, off of which the parking algorithm is based. That is, two sets of ultrasonic echoes may correlate to the curb and other object. Because the other object is higher in elevation and may present a stronger signal or echo, the curb may not be recognized.

As stated, vehicle 102 includes radars 128 that may support a blind spot information system (BLIS). Thus, data obtained using radars 128 that is fused with data from ultrasonic sensors that are typically used for APA, can enhance the ability to identify and assess an area for parking.

Figure 4:
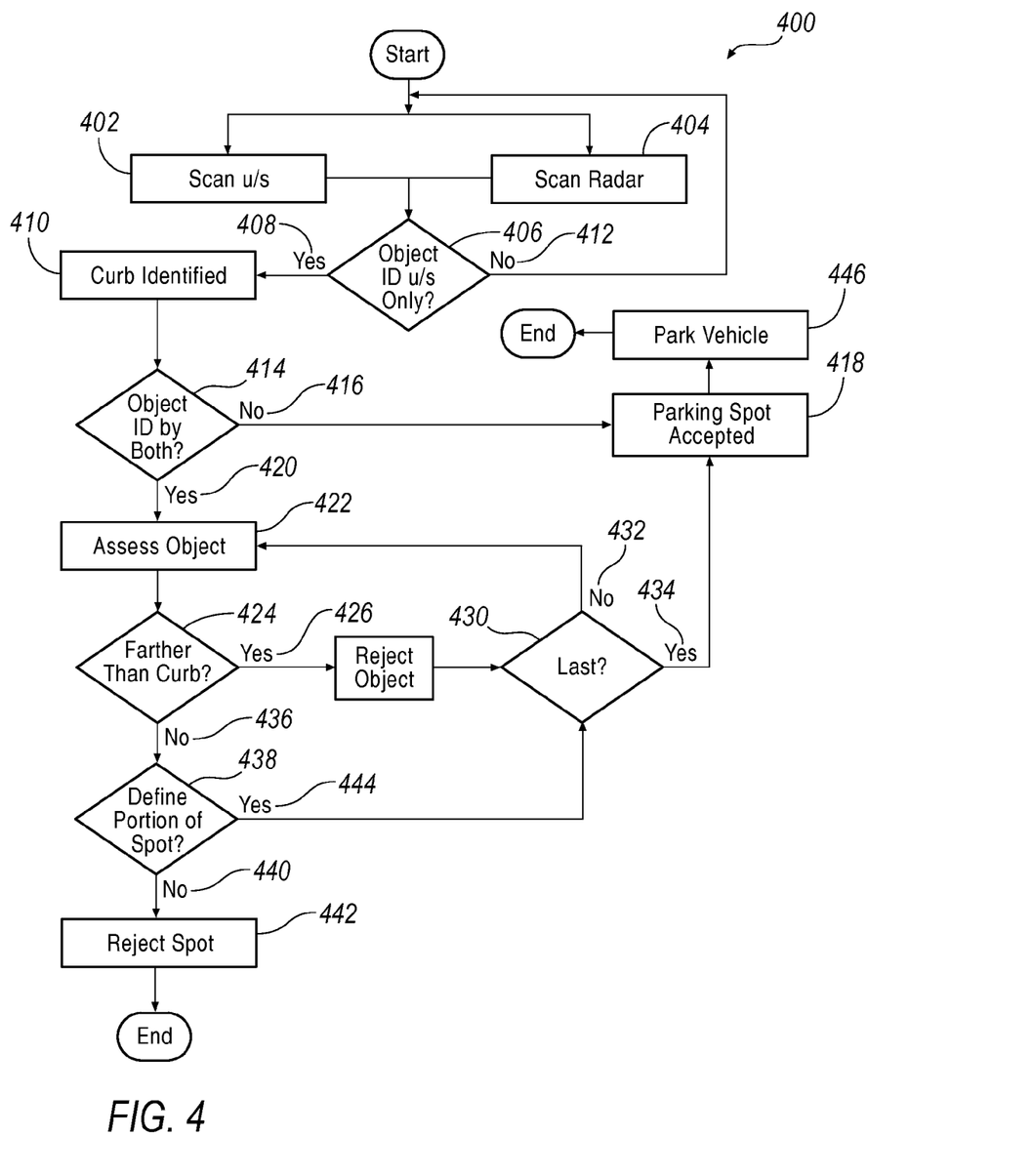
FIG. 4 illustrates a flowchart for fusing ultrasonic and radar scanning data.

Referring to FIG. 4, a method or algorithm 400 includes assessing an area for parking a vehicle that includes ultrasonically scanning the area to obtain ultrasonic data at block 402, and radar scanning the area to obtain radar data at block 404. The ultrasonic data may include both curb data and other object data. However, the radar is typically directed toward higher objects (such as cars in blind spots) and may detect higher objects but not the curb. Thus, at block 406, if an object is identified in the ultrasonic data only 408, then that object is identified as a curb 410 (or likely to be a curb, and may instead be a wall, but which defines a boundary for a possible parking space or area). That is, both ultrasonic and radar data may include overlapping identified objects, but if an object is identified only in the ultrasonic data, then that location is identified as a likely curb. However, if objects are not identified in only ultrasonic data 412, then control returns to blocks 402, 404 and ultrasonic and radar data are acquired again.

Once a curb is identified at block 410, control passes to block 414 to determine whether objects may be identified by both ultrasonic and radar. In some instances, objects may appear in ultrasonic data as scatter. Nevertheless, in conjunction with the acquired radar data, such data can be used to assess and affirmatively identify an object. Thus, in assessing the object data in block 414, if no object is identified in both 416 (i.e, there are no obstructions, objects detectable beyond the curb, or vehicles in front or rear of the possible parking space or spot), then the possible parking space is accepted 418. However, if one or more objects is identified by both 420 (ultrasonic and radar), then the object(s) are assessed at block 422. That is, once objects are identified, they are further assessed to determine whether they present an obstruction to parking (e.g., a parking cone or motorcycle), whether the object(s) are beyond the curb (and therefore would not present an obstruction), or whether the object(s) defined a front or rear of the possible parking space (e.g., vehicle 108 or 110).

Thus, at block 422 the object is assessed and if radar data is detected at the same location as the curb and, if so, the method further comprises determining the first object as a wall. Identified objects are assessed to determine whether farther than the curb at block 424. If so 426, then the object is rejected at block 428, as the object does not present an obstruction and is beyond where the vehicle will be parked. Further objects are assessed within the data 430 and if not the last object to assess 432, then control returns to block 422. However, if the last object for assessment 434, then the possible parking space is accepted 418.

If, during the assessment at 424, an object is identified that is not beyond the curb 436, then method 400 further determines 438 whether the object under assessment defines or forms a portion of the possible parking space or spot (e.g., it may be a vehicle in front or rear such as one of vehicles 108, 110). If not 440, then the object presents an obstruction and the spot is rejected at block 442 and the process ends until another possible parking space is assessed (the process would start again). However, if the object does define a portion of the spot 444 (and the object is in front or rear of a desired parking spot), then the possible parking space or area is bounded and control returns to block 430. Thus, method 400 results in accepting a spot at block 418 for parking, and the vehicle is parked at block 446, or the possible spot is rejected at block 442.

One enabler for the disclosed method is the radar that, in one embodiment, is used for BLIS. The disclosed method uses signals from the radar sensor to identify objects that would be missed or incorrectly identified by the ultrasonic sensor alone.

As the host vehicle is driven past an available parking slot, the ultrasonic and radar sensors detect various objects, including other vehicles, and send relative information to the Virtual Sensor via a vehicle high speed bus. The information being sent includes distances to each object, which may include a confidence factor. The distance to objects related to the angle beam can then be synchronized with other modules to achieve a more robust determination of surrounding objects. The radar points combined with the ultrasonic data points provide a more reliable location of objects relative to the host vehicle. With the more accurate information, the combined sensor data can estimate the dimensions necessary to park the host vehicle properly or to reject the slot as determined inappropriate.

The radar has the advantage of typically seeing higher objects during the maneuver and while scanning to detect the parking slot boundaries. Its beam pattern is higher and above the curb so that it can easily distinguish a curb from a wall and park the host vehicle at a desired distance from a wall. For instance and as described, if the ultrasonic sensor detects a curb and the radar identifies similar object at the same distance, then the signal from the radar can be used to confirm that the object to align to is a wall. That is, the radar cannot see curbs and therefore, if radar detects objects at the same distance as the ultrasonic, it is a wall because the ultrasonic sees walls and curbs at the same time.

The radar is also used as a real time feedback control to align to a wall at the desired distance, as the rear ultrasonic sensors are not typically available during the maneuver to create a closed loop feedback system. As one example a parking spot may be offered in-between a support arm and an axle of a trailer. The ultrasonic may not see so high, above perhaps 0.3 meter, therefore even though the body of the trailer is solid there is a space between the support arm and wheel axle. Another example is the overhand on a school bus. The ultrasonic typically sees the space between the axles but not the body in between. The height limitation of the ultrasonic causes the solid area of the higher objects to be outside of the reflection zone. With ultrasonic alone, this may show as a false detection spot. Tall pickup trucks and limousines may also have this effect. Radar, on the other hand, would detect the body of the vehicle and not the space between the axles. Thus, a combined data stream would result in rejecting a false spot that would bet offered with a traditional standalone ultrasonic system.

The same concept can be used to determine if it is a wall that borders the spot. Ultrasonic sensors will see a curb or a wall, but such systems are one-dimensional and may only determine distance to lower object(s) reliably. However radar will report out objects that are above 0.3 m.

Slot sizes are determined by the number of echoes and the quality of these same echoes reflected back to the APA. In general, the estimation of an actual parking slot length improves when the passing or scanning speed is low, as such it may be desirable to set speed thresholds that balance driving satisfaction (not driving too slow) with the ability to obtain more data (not driving too fast). That is, higher passing or scanning speed tends to reduce the amount of echo or data points reflected back and cause the System to inaccurately calculate the parking slot length. Also, at higher passing speed, the edges of surrounding vehicles may not be accurately detected if the returned data points missed those edges. Therefore, the estimated parking slot length could be longer that the actual slot length if speed control thresholds are not established.

Thus, a virtual sensor with radar uses higher resolution and higher processing speed of the radar to more accurately identify where the parking slot starts and finishes. Vehicle edge detection is important to final parking performance and the ultrasonic sensors alone may not be capable of detecting the edges consistently. The effect is multiplied at higher passing speeds. Thus, method 400 includes radar to enhance the computation of the slot length by supplying the missing information on the edges of the surrounding vehicles.

The ultrasonic sensors can be affected by environmental conditions. Depending on the humidity and temperature, the speed at which the echoes travel in air is vastly different. This could result in incorrect estimation of the distance to an object and incorrect estimation of the parking slot length.

Thus, parking slots may be inconsistently offered if based on ultrasonic alone. Some too-tight slots could be offered and other available parking slots could be rejected. In terms of parking performances, this can lead to an incorrectly calculated path into a potential parking slot and an inconsistent final parked position, which can increase driver dissatisfaction.

Radar, however, is not as sensitive to environmental conditions as the ultrasonic sensor. Thus, the combined sensor may be a corrective measure to verify distance to objects in a closed loop fashion and to correct miscalculated distances from the ultrasonic sensor. For example, if a vehicle length is not in agreement with the ultrasonic sensor by a certain threshold, then the parking slot would not be offered. This would prevent offering slots that are too tight and potentially not offering spots where the vehicle lengths are not measured correctly and the slot is large enough to be parked. As an example there can be enough scatter from the ultrasonic echo that a spot that is valid can be rejected. Snow in a potential parking spot can produce this effect. Radar can be used to verify there is no object in the spot and now can be offered by filtering out the false detections. Radar typically does not see objects below the 0.3 m threshold and therefore may not get reflections from snow.

The closed loop verification mentioned above allows for correct alignment to a wall, for example at a target distance of approximately 40 cm. Current implementations of the ultrasonic technology typically scans only once during the first pass, and then uses the information in memory to decide a trajectory that will not be modified. If the objects move or for some reason the slot was not accurately measured during the first run the radar allows for constant and expanded coverage of the parking slot area whereas the ultrasonic only sees a limited view. That is, the radar system includes an expanded range of coverage that typically extends from well in front of the vehicle to well in back of the vehicle (typically a meter or more in distance beyond the front and rear of the vehicle and on either side of the vehicle). This allows for better alignment to walls if the electric steering system is slower than expected due to low tire pressure or there is a higher friction due to internal heat, incorrect wheel speed counts/distance to due low tire pressure, etc.

Further, fusion of ultrasonic systems with radar better distinguishes curbs from objects in European scenarios, where it is common for vehicles to be parked over the curbs. Thus, in this scenario, if a curb is detected more proximate the host vehicle than, for instance, one or both of vehicles 108, 110, then reliance on ultrasonic sensors alone may result in the spot not being offered, but when the ultrasonic data is fused with radar, the spot will be offered as an open spot. Referring back to FIG. 4, at step 410 the curb is identified and at step 414, if the object is not identified by both ultrasonic and radar, the parking spot is accepted at step 418 even despite it being identified as not having a full depth of parking space available. That is, the parking spot is accepted at step 418 even if the spot does not have sufficient depth, would require parking in part over the curb or despite any front and/or rear vehicles themselves that may be parked over the curb.

In addition, fusion with a single echo strategy can be implemented as well. The above scenarios described throughout FIG. 4 may be employed using double echoes. Double echoes are multiple paths for highly reflective objects such as vehicles and walls that are vertical or almost vertical. With high temperature environmental effects, however, second echoes tend to disappear and a single echo strategy may be employed. Thus, single echoes typically provide adequate sensing when fused with radar without degrading the number of scenarios that can be offered.

PACM 206 may include a computer or a computer readable storage medium implementing method or algorithm 400. In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method of assessing a parking spot for parking a vehicle comprising:
   scanning the parking spot with ultrasonic sensors to obtain ultrasonic data;
   scanning the parking spot with radar sensors to obtain radar data;
   utilizing a computer to identify a first object as a likely curb if identified only in the ultrasonic data and to determine to accept or reject the parking spot based on both the ultrasonic data and the radar data; and
   parking the vehicle in response to accepting the parking spot.

2. The method of claim 1, further comprising utilizing the computer to determine whether another object is detected in the radar data and at the same location as the likely curb and, if so, the method further comprises utilizing the computer to determine the first object as a wall.

3. The method of claim 1, further comprising utilizing the computer to:
   assess if a curb has been identified, and if so, then the method further comprises utilizing the computer to determine whether a second object identification can be made using both the ultrasonic data and the radar data; and
   utilizing the computer to assess whether no second object identification has been made using both the ultrasonic data and the radar data, and if not, then the method further comprises utilizing the computer to accept the parking spot for the vehicle.

4. The method of claim 1, further comprising utilizing the computer to assess whether a second object identification has been made using both the ultrasonic data and the radar data, and if so, then the method further comprises utilizing the computer to assess whether the second object is nearer to the vehicle than the curb, or farther from the vehicle than the curb.

5. The method of claim 4, further comprising utilizing the computer to:
   assess if the second object is nearer to the vehicle than the curb;
   determine whether the second object defines a portion of a parking spot;
   assess if the second object is farther from the vehicle than the curb; and
   reject the second object as an obstruction in the parking spot in response to the second object being farther away from the vehicle than the curb.

6. The method of claim 1, wherein the step of utilizing the computer to determine to accept or reject the parking spot further comprises utilizing the computer to assess whether any obstructions are found in the parking spot using both the ultrasonic data and the radar data.

7. A non-transitory computer-readable medium tangibly embodying computer-executable instructions comprising steps to:
   assess a possible parking spot for a vehicle;
   acquire ultrasonic scanning data of the spot;
   acquire radar scanning data of the spot;
   identify a first object as a likely curb if identified only in the ultrasonic data;
   determine to accept or reject a parking spot based on both the ultrasonic and radar data; and
   parking the vehicle in response to accepting the parking spot.

8. The computer-readable medium of claim 7, the instructions further comprising steps to determine whether another object is detected in the radar scanning data and at the same location as the likely curb and, if so, further determine the first object as a wall.

9. The computer-readable medium of claim 7, the instructions further comprising steps to:

assess if a curb has been identified, and if so, then determine whether a second object identification can be made using both the ultrasonic scanning data and the radar scanning data; and assess whether no second object identification has been made using both the ultrasonic scanning data and the radar scanning data, and if not, then the method further comprises accepting the possible parking spot as a parking spot for the vehicle.

10. The computer-readable medium of claim 7, the instructions further comprising steps to assess whether a second object identification has been made using both the ultrasonic scanning data and the radar scanning data, and if so, then further assess whether the second object is nearer to the vehicle than the curb, or farther from the vehicle than the curb.

11. The computer-readable medium of claim 9, the instructions further comprising steps to:

assess if the second object is nearer to the vehicle than the curb, then determine whether the second object defines a portion of the possible parking spot; and assess if the second object is farther from the vehicle than the curb, then reject the second object as an obstruction in the area.

12. The computer-readable medium of claim 9, the instructions further comprising steps to determine whether to park in the possible parking spot by further assessing whether any obstructions are found in the possible parking spot using both the ultrasonic data and the radar data.

13. A host vehicle comprising:
an ultrasonic scanner;
a radar scanner; and
a computer programmed to:
  acquire ultrasonic data of an area,
  acquire radar data of the area,
  identify a first object as a likely curb if identified only in the ultrasonic data,
  determine to accept or reject a possible parking spot based on the ultrasonic data and on the radar data, and
  park the host vehicle in response to accepting the possible parking spot.

14. The host vehicle of claim 13, wherein the computer is further programmed to determine whether another object is detected in the radar data and at the same location as the likely curb and, if so, further determine the first object as a wall.

15. The host vehicle of claim 13, wherein the computer is further programmed to:

assess if a curb has been identified, and if so, then determine whether a second object identification can be made using both the ultrasonic data and the radar data; and assess whether no second object identification has been made using both the ultrasonic data and the radar data, and if not, then accept the possible parking spot as a parking spot for the vehicle.

16. The host vehicle of claim 13, wherein the computer is further programmed to:

assess whether a second object identification has been made using both the ultrasonic data and the radar data, and if so, then further assess whether the second object is nearer to the vehicle than the curb, or farther from the vehicle than the curb; or assess if the second object is nearer to the vehicle than the curb, then determine whether the second object defines a portion of the possible parking spot, and assess if the second object is farther from the vehicle than the curb, then reject the second object as an obstruction in the area.

17. The host vehicle of claim 13, wherein the computer is further programmed to determine whether to park in the possible parking spot by being further programmed to assess whether any obstructions are found in the area using both the ultrasonic data and the radar data.

\* \* \* \* \*